UNITED STATES PATENT OFFICE 2,327,183

DRY-CLEANING COMPOSITION

Lawrence H. Flett, Hamburg, N. Y., assignor to Allied Chemical & Dye Corporation, a corporation of New York No Drawing. Application January 14, 1939, Serial No. 250,917

13 Claims. (Cl. 252—161)

This invention relates to improvements in the dry cleaning of fibrous, textile and related materials. It relates particularly to improved compositions for use in dry cleaning and to processes of dry cleaning in which said improved compositions are employed.

It is well known that certain types of textile fabrics and materials such as leather cannot be cleaned by means of ordinary soap and water since they are prone to shrink, harden, wrinkle and/or fade when they are wetted with water. For the cleaning of such materials a dry cleaning process must be used. In such dry cleaning processes, volatile organic solvents such as naphtha, trichlorethylene, carbon tetrachloride, gasoline, benzene, Stoddard's solvent, etc. are used. These solvents are effective for removing from the fabrics or materials practically all grease stains as well as dust and dirt which commonly adhere to the greasy spots. It is further known that if a small amount of water is sufficiently well dispersed in the dry cleaning fluid that water-soluble stains such as those caused by sugary liquids, candy, soft drinks, etc. are removed without adversely affecting the material so treated.

According to the present invention a dry cleaning composition is used which contains as essential components a dry cleaning solvent or mixture of dry cleaning solvents and at least one salt of a sulfonated aliphatic dicarboxylic ester of an alcohol containing at least 3 carbon atoms. As employed herein, the term "sulfonated aliphatic dicarboxylic ester" denotes generically monoesters and diesters of sulfo- and sulfato-aliphatic dicarboxylic acids (esterified in the carboxyl group); that is, compounds in which a sulfonic acid radical is attached through its sulfur atom to a carbon atom of the carboxylic acid residue of the ester (a "sulfo-aliphatic dicarboxylic ester") or in which a sulfate radical is attached through an oxygen atom thereof to a carbon atom of the carboxylic acid residue of the ester (a "sulfato-aliphatic dicarboxylic ester"). Further, as employed herein, the term "alcohol" includes monohydric alcohols and their hydroxyl and esterified carboxyl derivatives. In its preferred form the dry cleaning composition of this invention also contains a small amount of water.

The said sulfuric acid derivatives are of the following general formula:

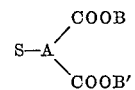

in which A represents the residue of an aliphatic dicarboxylic acid; B represents the residue of a monohydric alcohol containing at least 3 carbon atoms or of a partially or completely esterified polyhydric alcohol containing at least 3 carbon atoms in which the remaining hydroxyl groups may or may not be further esterified by another acid; B' represents hydrogen or equivalent salt-forming atom or group or one of the residues represented by B; and S represents either —SO₃H or —OSO₃H.

Examples of such compounds are: the disodium salt of sulfated monocetyl maleate:

$$C_{16}H_{33}.OOC.C_2H_3(OSO_3Na).COONa$$

the disodium salt of the monocarboxylic ester of monobutyl ricinoleate and sulfosuccinic acid; the monosodium salt of sulfated dicetyl maleate: $C_{16}H_{33}OOC.C_2H_3(OSO_3Na)COOC_{16}H_{33}$; disodium monobutyl sulfo succinate; monosodium dibutyl sulfo succinate; disodium monolauryl sulfo succinate; disodium monomyricyl sulfo succinate; monosodium dibutyl sulfo sebacate; monosodium diamyl sulfo adipate.

Compounds of the above-described general class have been found to give excellent results in improving dry cleaning compositions but it has been found that certain members of this class of compounds give even better results than the class as a whole. These more effective compounds form a group of preferred sulfonated ester salts which are characterized by the fact that they contain an alkyl group of eight or more carbon atoms as the radical represented by B in the above formula. It has been found further that those sulfonated esters that contain an alkyl group having 12 to 18 carbon atoms are more effective than those with an alkyl group of lower carbon content.

This invention contemplates the use of the sulfonated esters of the above general class in the form of salts in which the acidic hydrogen of the sulfate and/or sulfonate group is replaced by an inorganic or organic salt-forming radical. Among the more easily obtained salts are the ammonium, alkali metal and alkaline earth metal salts. Salts in which the acidic groups are neutralized by organic bases (such as mono-, di-, or tri-ethanolamine, pyridine, ethyleneamine, amylamine, triethylene-tetramine, etc.) also may be used. If the salt-forming basic radical is polybasic, it may be neutralized wholly with the sulfonated ester of the above general formula or in part with such a compound and in part with other acidic materials, which advantageously may have detergent properties. Examples of such other acidic materials are: di-isopropyl naphthalene sulfonic acid, n-propyl acid sulfate, hydrochloric acid, naphthalene sulfonic acid, sulfuric acid, phosphoric acid, etc.

The presence as dry cleaning assistants of the hereindefined sulfonated esters in a dry cleaning fluid has been found to be particularly effective in enabling the dry cleaning fluid, in which water is normally practically immiscible to hold in finely dispersed form a limited amount of water. It has been found that by using the sulfonated esters of the class defined above a substantially greater amount of water in relation to the amount of dry cleaning assistant present can be held in a well dispersed form in the dry cleaning solution than was heretofore possible. With the dry cleaning assistants of this invention the material to be cleaned may be solvent-washed in the absence of water with excellent results. However, better results are usually obtained by adding a small amount of water as such to the dry cleaning bath. Due to the presence of the sulfonated esters the water becomes incorporated and dispersed in such an extremely finely divided state in the dry cleaning composition that water-sensitive materials can be dry cleaned in such water-containing compositions without danger of water spotting. The exact amount of water needed in any given case varies somewhat according to the type of soil which is to be removed, and this generally varies with the particular material to be treated. For example, about 0.25% of water has been found to give good results in many cases. In general there must not be so much water present that it is in poorly dispersed form and so causes water-spotting of the material being dry cleaned. As is well known, the amount of moisture which the material will tolerate without suffering water-damage (wrinkling, shrinking, etc.) depends upon the particular material and its state of dryness as well as upon the degree of dispersion of the moisture in the dry cleaning solvents. The amount of water which a dry cleaning solvent can hold in a very finely-dispersed or non-wetting state with respect to the materials to be cleaned depends altogether upon the dry cleaning assistant which is added to the solution, and it has been found that the members of the class of dry cleaning assistants hereinbefore defined are very substantially better for the purpose than those used according to the prior art. Practical comparative tests show that the dry cleaning compositions of this invention are a substantial improvement over compositions heretofore used.

Substantial economies in dry cleaning are shown by the use of the hereinbefore defined sulfonated esters in the dry cleaning compositions of this invention. This is due to the fact that much less of the said ester is necessary to produce an excellent cleaning effect than has previously been used of the currently-known dry cleaning assistants. Thus, it has been found that, when the sulfonated esters represented by the above general formula are used, less than one-third of the usual amount of dry cleaning assistant need be added to the dry cleaning solvent to prepare adequate dry cleaning compositions.

In addition, the use as dry cleaning assistants of the compounds represented by the foregoing general formula imparts an increased cleaning action to the compositions containing them, and obviates harmful and undesirable effects on the color and finish of the material cleaned therewith. Further, the aforesaid sulfonated compounds are for the most part not lime-sensitive and therefore they do not form insoluble calcium salts nor cause undesirable deposits of insoluble calcium salts to be formed in the dry cleaning baths as do many compounds heretofore used, when water introduced in such baths contains water-soluble calcium salts.

The dry cleaning compositions of this application may be made from many different types of dry cleaning solvents. Heretofore each type of dry cleaning assistant was usable and compatible only with one or a limited class of dry cleaning solvents, whereas the dry cleaning assistants which are used for preparing the dry cleaning compositions of the present invention may be used with excellent results in practically any dry cleaning solvent. The presence of said sulfonated esters as dry cleaning assistants in the dry cleaning compositions of this invention also has the very desirable effect of greatly decreasing the internal electrical resistance of inflammable solvents or solvent mixtures; thereby substantially decreasing the danger of fire from spark discharges or static electricity.

In many modern dry cleaning plants it is the practice to remove undissolved dirt from the dry cleaning solution by filtration. The presence of the hereinbefore defined sulfonated esters in the dry cleaning baths aids in decreasing the clogging effects of the dirt on the filter media and retards the development of back pressures in the filters. In this way the period during which the dry cleaning solution can be recirculated before plugging the filter is substantially increased with resulting economy in operation.

The invention is illustrated by the following examples in which the parts are by weight:

*Example 1.*—A cleaning bath was obtained by shaking 3.0 parts of disodium salt of sulfated monocetyl maleate, i. e., $$C_{16}H_{33}.OOC.C_2H_3(OSO_3Na).COONa$$

with 1115 parts by weight of V. M. P. naphtha, a hydrocarbon mixture having a specific gravity of 0.746 and a boiling range of 215–320° F. and of which 90 per cent of the distillate distilled between 215° F. and at 279° F. A piece of flannel soiled with tallow and carbon black was agitated mechanically in this dry cleaning composition for about half an hour. The flannel was withdrawn and allowed to dry. The dry cleaned material was substantially free from soil and very bright, showing very good cleaning action by the composition.

In Examples 2 through 15, the results of which are listed in Table I, the same procedure was followed, i. e., the dry cleaning compositions were first prepared by mixing the ingredients and then used to clean soiled flannel.

TABLE I

SUMMARY OF EXAMPLES

*Cleaning compositions*

| Ex. No. | Sulfuric acid deriv. salts | | | Dry cleaning solvents | | Water |
|---|---|---|---|---|---|---|
| | Amt. (parts by wt.) | Kind | Amt. (parts by wt.) | Kind | | Amt. (parts by wt.) |
| 2 | 3.0 | Disodium salt of sulfated monocetyl maleate, i. e., $C_{16}H_{33}OOC.C_2H_3\text{-}(OSO_3Na).COONa.$ | 1,115 | V. M. P. naphtha | | 2.5 |
| 3 | 3.0 | Monosodium salt of sulfated dicetyl maleate, i. e., $C_{16}H_{33}OOC.C_2H_3\text{-}(OSO_3Na).COOC_{16}H_{33}.$ | 1,115 | ......do...... | | |
| 4 | 3.0 | ......do...... | 1,115 | ......do...... | | 2.5 |
| 5 | 3.0 | ......do...... | 2,190 | Trichlorethylene | | |
| 6 | 3.0 | ......do...... | 2,190 | ......do...... | | 2.5 |
| 7 | 3.0 | ......do...... | 2,390 | Tetrachlorethylene | | |
| 8 | 3.0 | ......do...... | 2,390 | ......do...... | | 2.5 |
| 9 | 1.5 | Disodium salt of the monocarboxylic ester of monobutyl ricinoleate and sulfosuccinic acid. | 1,115 | V. M. P. naphtha | | |
| 10 | 1.5 | ......do...... | 1,115 | ......do...... | | 2.5 |
| 11 | 1.5 | Neutral sodium salt of the monocarboxylic ester of hydroxy-stearic acid and sulfosuccinic acid. | 1,115 | ......do...... | | |
| 12 | 1.5 | Disodium salt of monocarboxylic ester of oleyl alcohol and sulfosuccinic acid. | 1,115 | ......do...... | | |
| 13 | 1.5 | Monosodium salt of the dicarboxylic ester of hexyl alcohol and sulfosuccinic acid. | 1,115 | ......do...... | | |
| 14 | 1.5 | Hexasodium salt of castor oil tri-(monocarboxylic ester of) sulfosuccinic acid. | 1,115 | ......do...... | | |
| 15 | 1.5 | ......do...... | 1,115 | ......do...... | | 2.5 |

In each of the above examples very efficient cleansing action was obtained. It was noted that the dry cleaning compositions which contained water in addition to a sulfonated ester of the class hereinbefore defined gave better cleansing action than the same compositions without water.

In most of Examples 1–15 commercial preparations of the salt of the sulfonated esters were used. These contain rather large quantities of materials such as inorganic sodium salts, e. g., sodium chloride and sodium sulfate, that probably have little if any cleaning action. However, such amounts of such commercial preparations were used that at least 1.5 parts by weight of sulfonated ester in the form of the sodium salt were present. From this it can be seen that my addition compounds are unaffected by the presence of inert foreign matter. It is therefore unnecessary to use the addition compounds in a perfectly pure state.

It will be noted from the above examples that an outstanding characteristic of the new dry cleaning compositions of this invention is their ability to attain excellent cleaning action with very low concentration of addition compound, particularly when water is added to the bath in small amounts. Thus, the weight ratio of the sulfonated ester salt to organic substantially water-immiscible dry cleaning solvent or solvent mixture need not be greater than 1.0:100 and is preferably less than 0.3:100. In fact, dry cleaning compositions containing as little as 1 to 3 parts of the dry cleaning assistants of the present invention per 1000 parts of solvent by weight have been found to give highly satisfactory cleaning.

An improved finish and/or feel of the dry cleaned materials can often be obtained by incorporating a small amount of a paraffin hydrocarbon or similar agent, such as paraffin wax or paraffin oil, into the cleaning composition. Thus, the presence of about 0.1% to 1% of paraffin oil has been found effective for this purpose.

The salts of sulfuric acid derivatives which are represented by the general formula above are effective as dry cleaning assistants in practically any volatile organic liquid of the dry cleaning type, for example, naphtha, trichlorethylene, tetrachlorethylene, Stoddard's solvent, benzene, gasoline, and carbon tetrachloride.

Salts of the sulfonated esters which are employed in accordance with the present invention may be prepared in any convenient manner and by any one of several known methods. For example, a sulfonic dicarboxylic acid may be esterified in the carboxyl group or groups. Or a suitable ester may be treated with a sulfonating agent under conditions such as to avoid extensive breakdown of the original ester linkage. In some cases the sulfuric group may be introduced by treating the ester with a bisulfite. This method has been used to convert esters of maleic acid into the corresponding sulfosuccinic acid derivatives. Other methods are known and described in the art.

The sulfonated compounds employed in accordance with this invention have been found to give excellent results in the cleaning of all kinds of materials and fabrics such as wool, silk, cotton, leather and rayon. The compositions are effective in the removal of all types of soil, dirt, or stains. They may be used in practically any machinery or device used in commercial dry cleaning and in any particular purifying or recovery process which is applied to the dry cleaning fluid.

The addition of various other products such as other organic sulfuric acid derivatives, soaps, fatty acids, etc. do not substantially affect the excellent properties of the dry cleaning compositions of the present invention.

I claim:

1. A dry cleaning composition comprising an emulsion of water in a volatile organic dry cleaning solvent, the water being in the internal phase, and a salt of a sulfonated aliphatic dicarboxylic ester of an alcohol containing at least 3 carbon atoms, as a dry cleaning assistant and as an emulsifying agent for the water, said salt being selected from the group consisting of ammonium, alkali metal, alkaline earth metal, and organic ammonium salts, the amount of said salt being not more than 1 per cent of the weight of the volatile organic dry cleaning solvent.

2. A dry cleaning composition comprising an emulsion of water in a volatile organic dry cleaning solvent, the water being in the internal phase, and a salt of a sulfonated aliphatic dicarboxylic ester of an alcohol containing at least 8 carbon atoms, as a dry cleaning assistant and as an emulsifying agent for the water, said salt being selected from the group consisting of ammonium, alkali metal, alkaline earth metal, and organic ammonium salts, the amount of said salt being not more than 1 per cent of the weight of the volatile organic dry cleaning solvent.

3. A dry cleaning composition comprising a volatile organic dry cleaning solvent and, as a dry cleaning assistant, a salt of a sulfato-aliphatic dicarboxylic ester of an alcohol containing at least 3 carbon atoms, said salt being selected from the group consisting of ammonium, alkali metal, alkaline earth metal, and organic ammonium salts, the amount of said salt being not more than 1 per cent of the weight of the volatile organic dry cleaning solvent.

4. A dry cleaning composition comprising an emulsion of water in a volatile organic dry cleaning solvent, the water being in the internal phase, and a salt of a sulfated maleic ester of an alcohol containing at least 8 carbon atoms, as a dry cleaning assistant and as an emulsifying agent for the water, said salt being selected from the group consisting of ammonium, alkali metal, alkaline earth metal, and organic ammonium salts, the amount of said salt being not more than 1 per cent of the weight of the volatile organic dry cleaning solvent.

5. A dry cleaning composition comprising an emulsion of water in a volatile organic dry cleaning solvent, the water being in the internal phase, and a salt of a sulfo-aliphatic dicarboxylic ester of an alcohol containing at least 3 carbon atoms, as a dry cleaning assistant and as an emulsifying agent for the water, said salt being selected from the group consisting of ammonium, alkali metal, alkaline earth metal, and organic ammonium salts, the amount of said salt being not more than 1 per cent of the weight of the volatile organic dry cleaning solvent.

6. A dry cleaning composition comprising an emulsion of water in a volatile organic dry cleaning solvent, the water being in the internal phase, and an alkali metal salt of a sulfonated aliphatic dicarboxylic ester of an alcohol containing 12 to 18 carbon atoms, as a dry cleaning assistant and as an emulsifying agent for the water, the amount of said salt being not more than 0.3 per cent of the weight of the volatile organic dry cleaning solvent.

7. A dry cleaning composition comprising an emulsion of water in a volatile organic dry cleaning solvent, the water being in the internal phase, and a salt of a sulfonated aliphatic dicarboxylic ester of an alcohol containing at least 8 carbon atoms, as a dry cleaning assistant and as an emulsifying agent for the water, said salt being selected from the group consisting of ammonium, alkali metal, alkaline earth metal, and organic ammonium salts, the amount of said salt being not more than 0.3 per cent of the weight of the volatile organic dry cleaning solvent.

8. A dry cleaning composition comprising an emulsion of water in a volatile organic dry cleaning solvent, the water being in the internal phase, and a salt of a sulfato-aliphatic dicarboxylic ester of an alcohol containing 12 to 18 carbon atoms, as a dry cleaning assistant and as an emulsifying agent for the water, said salt being selected from the group consisting of ammonium, alkali metal, alkaline earth metal, and organic ammonium salts, the amount of said salt being not more than 0.3 per cent of the weight of the volatile organic dry cleaning solvent.

9. A dry cleaning composition comprising an emulsion of water in a volatile organic dry cleaning solvent, the water being in the internal phase, and an alkali metal salt of a sulfo-aliphatic dicarboxylic ester of an alcohol containing 12 to 18 carbon atoms, as a dry cleaning assistant and as an emulsifying agent for the water, the amount of said salt being not more than 1 per cent of the weight of the volatile organic dry cleaning solvent.

10. A dry cleaning composition comprising an emulsion of water in a volatile organic dry cleaning solvent, the water being in the internal phase, and a sodium salt of a sulfo-succinic acid ester of an alcohol containing at least 8 carbon atoms, as a dry cleaning assistant and as an emulsifying agent for the water, the amount of said salt being not more than 0.3 per cent of the weight of the volatile organic dry cleaning solvent.

11. A dry cleaning composition comprising an emulsion of water in a volatile organic dry cleaning solvent, the water being in the internal phase, and the disodium salt of monolauryl sulfosuccinic acid, as a dry cleaning assistant and as an emulsifying agent for the water, the amount of said salt being not more than 1 per cent of the weight of the volatile organic dry cleaning solvent.

12. A dry cleaning composition comprising an emulsion of water in a volatile organic dry cleaning solvent, the water being in the internal phase, and the disodium salt of sulfated monocetyl maleate, as a dry cleaning assistant and as an emulsifying agent for the water, the amount of said salt being not more than 1 per cent of the weight of the volatile organic dry cleaning solvent.

13. A dry cleaning composition comprising an emulsion of water in a volatile organic dry cleaning solvent, the water being in the internal phase, and the disodium salt of the monocarboxylic ester of monobutyl ricinoleate and sulfosuccinic acid, as a dry cleaning assistant and as an emulsifying agent for the water, the amount of said salt being not more than 1 per cent of the weight of the volatile organic dry cleaning solvent.

LAWRENCE H. FLETT.